(12) United States Patent
Noh et al.

(10) Patent No.: US 8,724,540 B2
(45) Date of Patent: May 13, 2014

(54) REFERENCE SIGNAL TRANSMISSION METHOD AND APPARATUS IN WIRELESS COMMUNICATION SYSTEM INCLUDING RELAY STATION

(75) Inventors: Min Seok Noh, Anyang-si (KR); Han Gyu Cho, Anyang-si (KR); Kyu Jin Park, Anyang-si (KR); Jae Hoon Chung, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 13/503,239

(22) PCT Filed: Oct. 21, 2010

(86) PCT No.: PCT/KR2010/007216
§ 371 (c)(1),
(2), (4) Date: Apr. 20, 2012

(87) PCT Pub. No.: WO2011/049379
PCT Pub. Date: Apr. 28, 2011

(65) Prior Publication Data
US 2012/0213147 A1    Aug. 23, 2012

Related U.S. Application Data

(60) Provisional application No. 61/253,840, filed on Oct. 21, 2009, provisional application No. 61/254,203, filed on Oct. 22, 2009.

(30) Foreign Application Priority Data

Oct. 20, 2010    (KR) .................. 10-2010-0102299

(51) Int. Cl.
*H04W 72/04*    (2009.01)
*H04W 88/04*    (2009.01)
*H04L 27/28*    (2006.01)
*H04J 11/00*    (2006.01)
*H04W 36/20*    (2009.01)

(52) U.S. Cl.
USPC ........................... 370/315; 370/329; 375/346

(58) Field of Classification Search
USPC .......... 370/315, 320, 329, 338; 375/211, 260, 375/340, 346, 348; 455/7, 17
See application file for complete search history.

(56) References Cited

U.S. PATENT DOCUMENTS

2010/0232546 A1* 9/2010 Yu et al. ................... 375/300
2012/0015661 A1   1/2012 Awad
(Continued)

FOREIGN PATENT DOCUMENTS

JP   2012-521665 A   9/2012
JP   2013-507852 A   3/2013

OTHER PUBLICATIONS

Catt, "Design of Reference Signals for Relay Backhaul Link in LTE-A," 3GPP TSG RAN WG1 Meeting #58bis, Agenda Item 7.8.1, R1-094152, Miyazaki, Japan, Oct. 12-16, 2009, 4 pages.
(Continued)

*Primary Examiner* — Ahmed Elallam
(74) *Attorney, Agent, or Firm* — Birch, Stewart, Kolasch & Birch, LLP

(57) ABSTRACT

The present invention provides a reference signal transmission method and apparatus by a base station in a wireless communication system including a relay station. The base station generates a plurality of relay-physical downlink control channel (R-PDCCH) reference signals for the demodulation of an R-PDCCH which is a control channel for the relay station relative to each of a plurality of layers, maps the plurality of R-PDCCH reference signals with R-PDCCH regions included in a relay zone within at least one resource block according to a predetermined reference signal pattern, and transmits at least one resource block through a plurality of antenna ports.

14 Claims, 19 Drawing Sheets

(56) References Cited

U.S. PATENT DOCUMENTS

| | | |
|---|---|---|
| 2012/0063386 A1* | 3/2012 | Park et al. .................. 370/315 |
| 2012/0069790 A1* | 3/2012 | Chung et al. ............... 370/315 |
| 2012/0113889 A1* | 5/2012 | Noh et al. ................... 370/315 |
| 2012/0128039 A1* | 5/2012 | Kim et al. ................... 375/211 |
| 2012/0236798 A1 | 9/2012 | Raaf et al. |

OTHER PUBLICATIONS

Koivisto, "LTE-Advanced research in 3GPP", GIGA seminar '08, Apr. 12, 2008, Nokia.

R1-090153, "Control Channel and Data Channel Design for Relay Link in LTE-Advanced", 3GPP TSG-RAN1 #55bis, Jan. 12-16, 2009, Ljubljana, Slovenia.

R1-092418, "Relay Link Control Signaling", 3GPP TSG RAN WG 1 Meeting #57bis, pp. 1-5, Jun. 29-Jul. 3, 2009, Los Angeles, USA.

R1-094152, "Design of reference signals for relay backhaul link in LTE-A", 3GPP TSG RAN WG1 meeting #58bis, Oct. 12-16, 2009, Miyazaki, Japan.

Samsung, "DL Backhaul Design for Type 1 Relay," 3GPP TSG WG1 Meeting #58bis, Agenda Item 7.8.1, R1-094100, Miyazaki, Japan, Oct. 12-16, 2009, 4 pages.

* cited by examiner

FIG. 13

(a) | eNB PDCCH (3 symbols) | PDSCH for macro UEs |
| | Relay Zone (R-PDCCH & R-PDSCH) | Idle |
| | PDSCH for macro UEs |

(b) | RN PDCCH (2 symbols) | Transition Gap | | Transition Gap |

(a)

(b)

REFERENCE SIGNAL TRANSMISSION METHOD AND APPARATUS IN WIRELESS COMMUNICATION SYSTEM INCLUDING RELAY STATION

This application is the National Phase of PCT/KR2010/007216 filed on Oct. 21, 2010 which claims priority under 35 U.S.C. 119 (a) to application No. 10-2010-0102299, filed on Oct. 20, 2010 in the Republic of Korea and under 35 U.S.C. 119 (e) to U.S. Provisional application Nos. 61/253,840 filed on Oct. 21, 2009 and 61/254,203 filed on Oct. 22, 2009 all of which are hereby expressly incorporated by reference into the present application.

BACKGROUND OF THE INVENTION

1. Field of the Invention

The present invention relates to wireless communications, and more particularly, to a method and apparatus for transmitting a reference signal in a wireless communication system including a relay station.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a least square (LS) method is used.

$$\hat{h}=y/p=h+n/p=h+\hat{n} \qquad \text{[Equation 1]}$$

The accuracy of the channel estimation value ĥ estimated using the reference signal p is determined by the value n̂. To accurately estimate the value h, the value n̂ must converge on 0. To this end, the influence of the value n̂ has to be minimized by estimating a channel using a large number of reference signals. A variety of algorithms for a better channel estimation performance may exist.

Meanwhile, a wireless communication system including a relay station (RS) has recently been developed. A relay station functions to extend the cell coverage and improve transmission performance. If a base station (BS) serves UE placed at the boundaries of the coverage of the BS through a relay station, an effect that the cell coverage is extended can be obtained. Furthermore, the transmission capacity can be increased if a relay station improves reliability in signal transmission between a BS and UE. If UE is placed in a shadow region although it is within the coverage of a BS, the UE may use a relay station. Uplink and downlink between a BS and a relay station is a backhaul link, and uplink and downlink between a BS and UE or a relay station and UE is an access link. Hereinafter, a signal transmitted through the backhaul link is called a backhaul signal, and a signal transmitted through the access link is called an access signal.

There is a need for a method of efficiently transmitting reference signals for a relay station.

SUMMARY OF THE INVENTION

The present invention provides a method and apparatus for transmitting a reference signal in a wireless communication system including a relay station.

In an aspect, a method of transmitting a reference signal by a base station in a wireless communication system including a relay station is provided. The method includes generating a plurality of relay-physical downlink control channel (R-PDCCH) reference signals for demodulation of an R-PDCCH which is a control channel for the relay station respectively for a plurality of layers, mapping the plurality of R-PDCCH reference signals to an R-PDCCH region included in a relay zone within at least one resource block based on a predetermined reference signal pattern, and transmitting the at least one resource block through a plurality of antenna ports. The relay zone may occupy either $4^{th}$ to $13^{th}$ orthogonal frequency division multiplexing (OFDM) symbols or $5^{th}$ to $13^{th}$ OFDM symbols of one subframe. The R-PDCCH region may occupy first three OFDM symbols of the relay zone or occupies first three OFDM symbols of a $2^{nd}$ slot of a subframe to which the relay zone belongs. The plurality of R-PDCCH reference signals may be mapped to a $1^{st}$ OFDM symbol of the R-PDCCH region. The plurality of R-PDCCH reference signals may be mapped to $1^{st}$ and $3^{rd}$ OFDM symbols of the R-PDCCH region. The plurality of R-PDCCH reference signals may be multiplexed based on a code division multiplexing (CDM). The CDM multiplexing may be performed based on an orthogonal sequence. Some or all of the plurality of R-PDCCH reference signals may be cell-specific reference signals (CRSs) of $3^{rd}$ generation partnership project (3GPP) long term evolution (LTE) or demodulation reference signals (DMRSs) of 3GPP LTE-advanced (LTE-A). The method may further include signaling whether to use the CRS of 3GPP LTE or the DMRS of 3GPP LTE-A as the some or all of the R-PDCCH reference signals through a higher layer. Each of the plurality of R-PDCCH reference signals may be mapped with a specific subcarrier spacing in the at least one resource block.

In another aspect, a method of demodulating a control channel by a relay station in a wireless communication system including the relay station is provided. The method includes receiving a plurality of relay-physical downlink control channel (PDCCH) reference signals for an R-PDCCH which is a control channel for the relay station through an R-PDCCH region included in a relay zone within a downlink subframe, and demodulating the R-PDCCH by processing the plurality of R-PDCCH reference signals.

In another aspect, an apparatus for transmitting a reference signal is provided. The apparatus includes a radio frequency (RF) unit for transmitting or receiving a radio signal, and a processor coupled to the RF unit, wherein the processor is configured for generating a plurality of relay-physical downlink control channel (R-PDCCH) reference signals for demodulation of an R-PDCCH which is a control channel for the relay station respectively for a plurality of layers, mapping the plurality of R-PDCCH reference signals to an R-PDCCH region included in a relay zone within at least one resource block based on a predetermined reference signal pattern, and transmitting the at least one resource block through a plurality of antenna ports.

A relay-physical downlink control channel (R-PDCCH) can be effectively demodulated by allocating an R-PDCCH reference signal for demodulation of the R-PDCCH which is a control channel for a relay station.

BRIEF DESCRIPTION OF THE DRAWINGS

FIG. 13 is an example of a downlink subframe to which a relay zone has been allocated.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
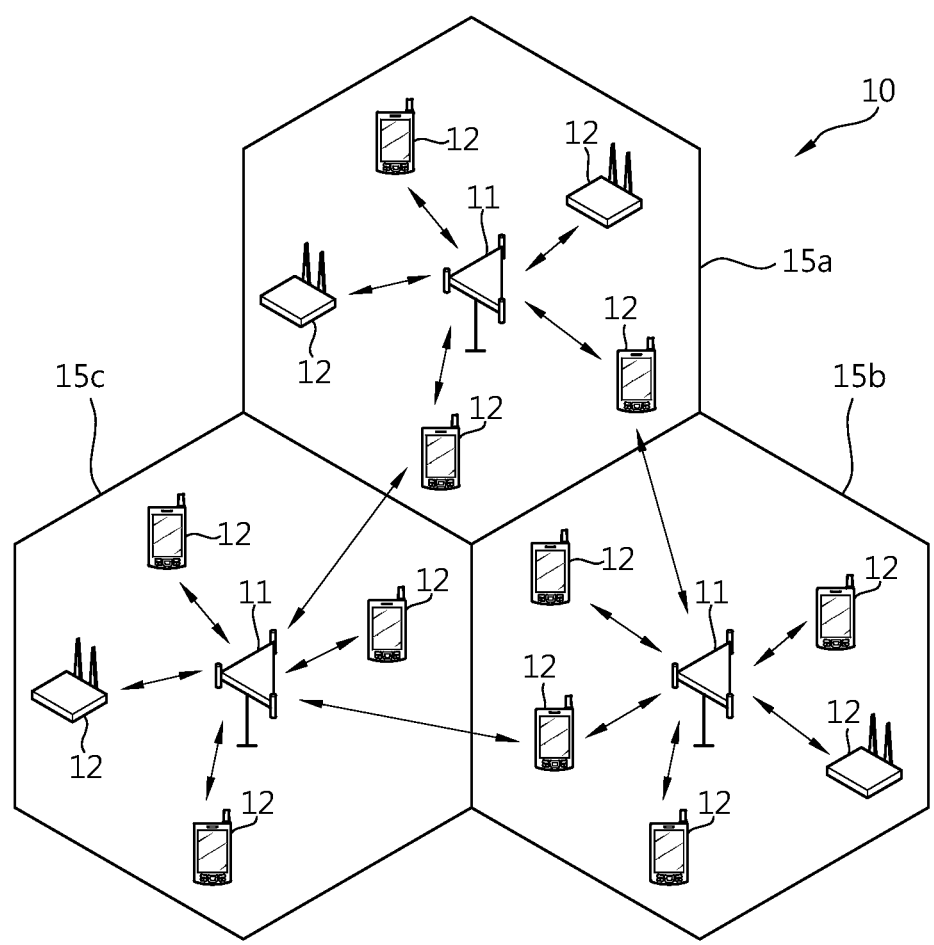
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

Figure 2:
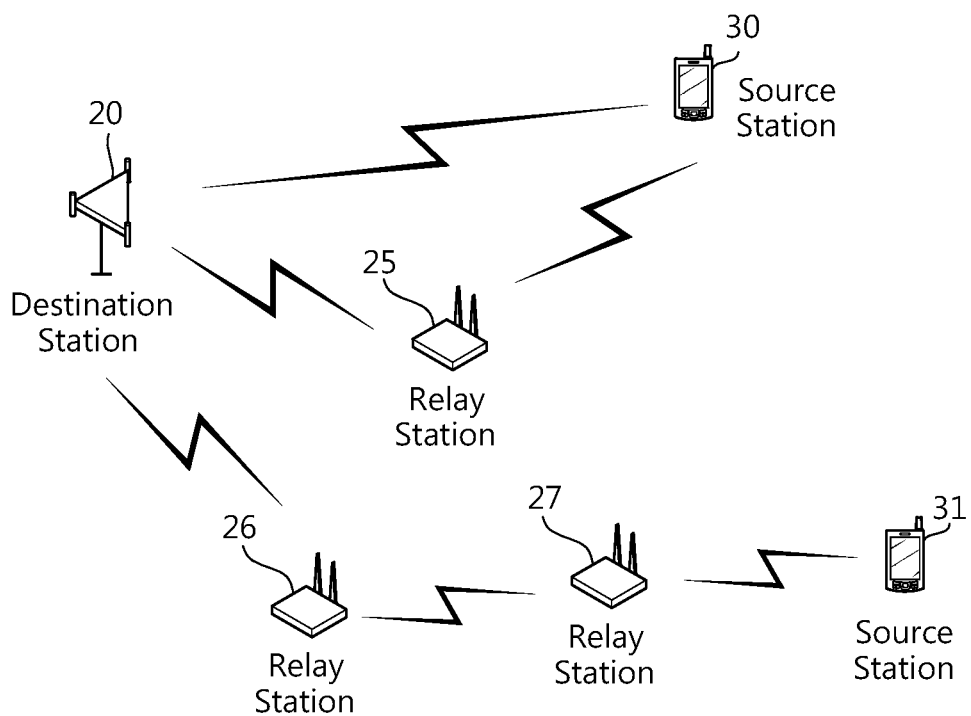
FIG. 2 shows an example of a wireless communication system using a relay station (RS).

FIG. 2 shows an example of a wireless communication system using a relay station (RS).

In uplink (UL) transmission, a source station may be a UE, and a destination stations may be a BS. In downlink (DL) transmission, a source stations may be the BS, and a destination stations may be the UE. The RS may be the UE, or may be provided as a separate RS. The BS may perform functions such as connectivity, management, control, and resource assignment between the RS and the UE.

Referring to FIG. 2, a destination station 20 communicates with a source station 30 via an RS 25. In UL transmission, the source station 30 transmits UL data to the destination station 20 and the RS 25, and the RS 20 retransmits the received data. The destination station 20 also communicates with a source station 31 via RSs 26 and 27. In UL transmission, the source station 31 transmits UL data to the destination station 20 and the RSs 26 and 27, and the RSs 26 and 27 retransmit the received data simultaneously or in sequence.

Although one destination station 20, three RSs 25, 26, and 27, and two source stations 30 and 41 are shown herein, the present invention is not limited thereto. The number of destination stations, RSs, and source stations included in the wireless communication system is not limited to any particular number.

A relay scheme used in the RS may be either amplify and forward (AF) or decode and forward (DF), and the technical features of the present invention are not limited thereto.

Figure 3:
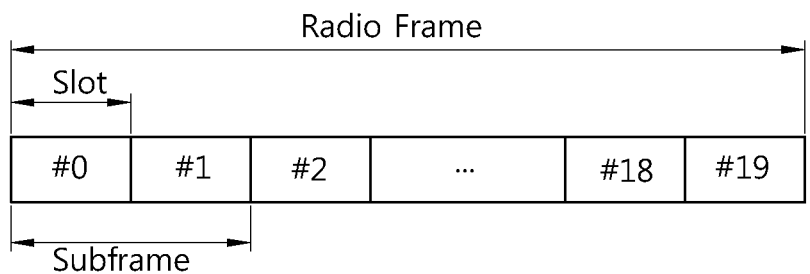
FIG. 3 shows the structure of a radio frame in 3GPP LTE.

FIG. 3 shows the structure of a radio frame in 3GPP LTE. It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 3, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 4:
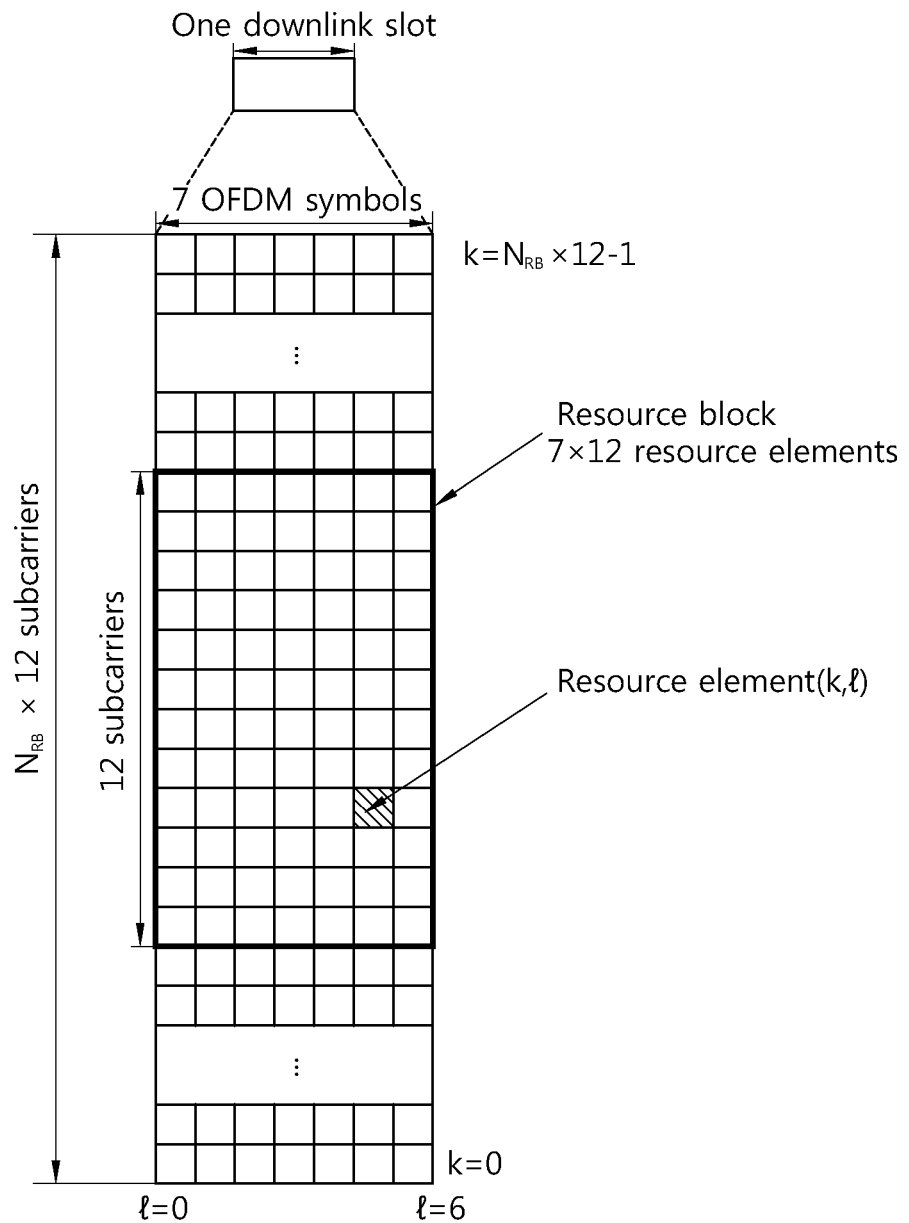
FIG. 4 shows an example of a resource grid of a single downlink slot.

FIG. 4 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 5:
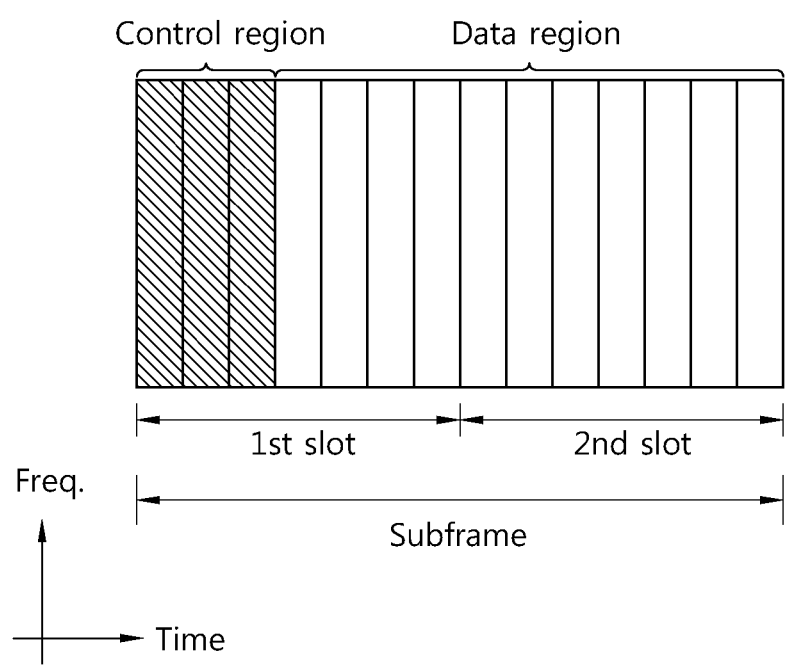
FIG. 5 shows the structure of a downlink subframe.

FIG. 5 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 6:
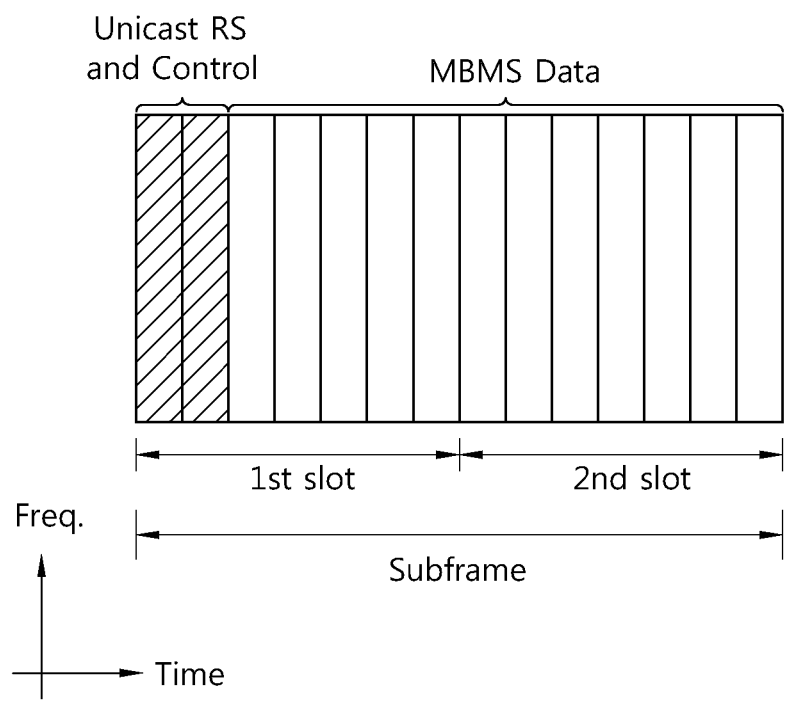
FIG. 6 shows the structure of a multimedia broadcast and multicast single frequency network (MBFSN) subframe.

FIG. 6 shows the structure of a multimedia broadcast and multicast single frequency network (MBFSN) subframe. The MBSFN subframe may be configured for transmitting a multimedia broadcast and multicast service (MBMS) data. First one or two OFDM symbols in the MBSFN subframe may be used for transmitting a unicast data or a control signal. The remaining OFDM symbols may be used for transmitting the MBMS data.

Figure 7:
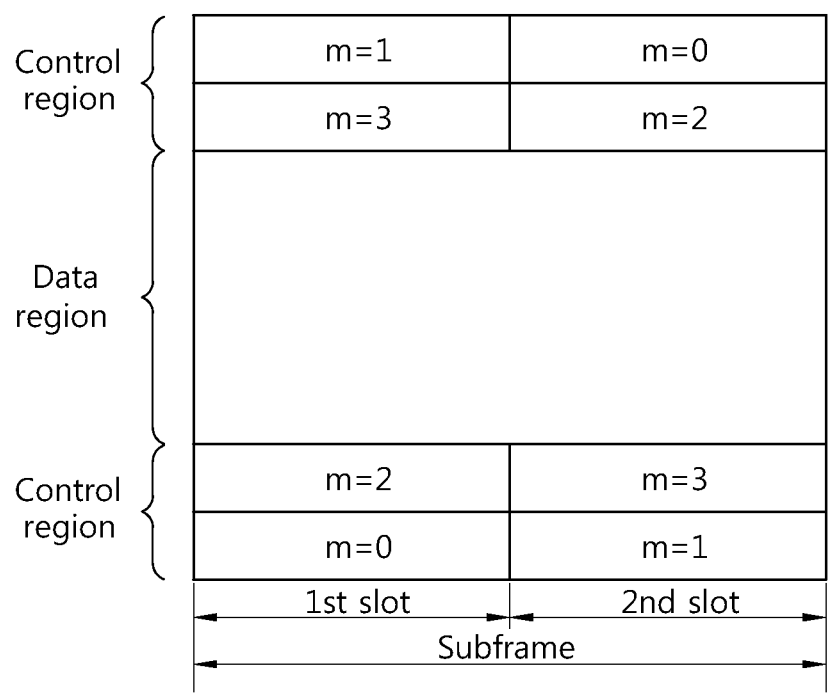
FIG. 7 shows the structure of an uplink subframe.
Figure 7:
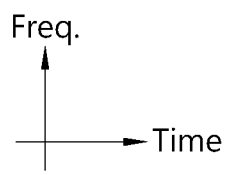

FIG. 7 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUSCH) for transmitting data is allocated to the data region. The user equipment does not transmit the PUCCH and the PUSCH simultaneously to maintain a single carrier property.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 7, m is a position index indicating the logical frequency domain positions of the pair of RBs allocated to the PUCCH in the subframe.

Uplink control information transmitted on the PUCCH may include a HARQ ACK/NACK, a channel quality indicator (CQI) indicating the state of a downlink channel, a scheduling request (SR), and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A reference signal is generally transmitted as a sequence. A reference signal sequence is not particularly limited and a certain sequence may be used as the reference signal sequence. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A reference signal can be classified into a cell-specific reference signal (CRS), an MBSFN reference signal, a user equipment-specific reference signal (UE-specific RS) and a position reference signal (PRS). The CRS is transmitted to all the UEs within a cell and used for channel estimation. The MBSFN reference signal can be transmitted in sub-frames allocated for MBSFN transmission. The UE-specific reference signal is received by a specific UE or a specific UE group within a cell, and may be referred to a dedicated RS (DRS). The DRS is chiefly used by a specific UE or a specific UE group for the purpose of data demodulation.

First, a CRS is described.

Figure 8:
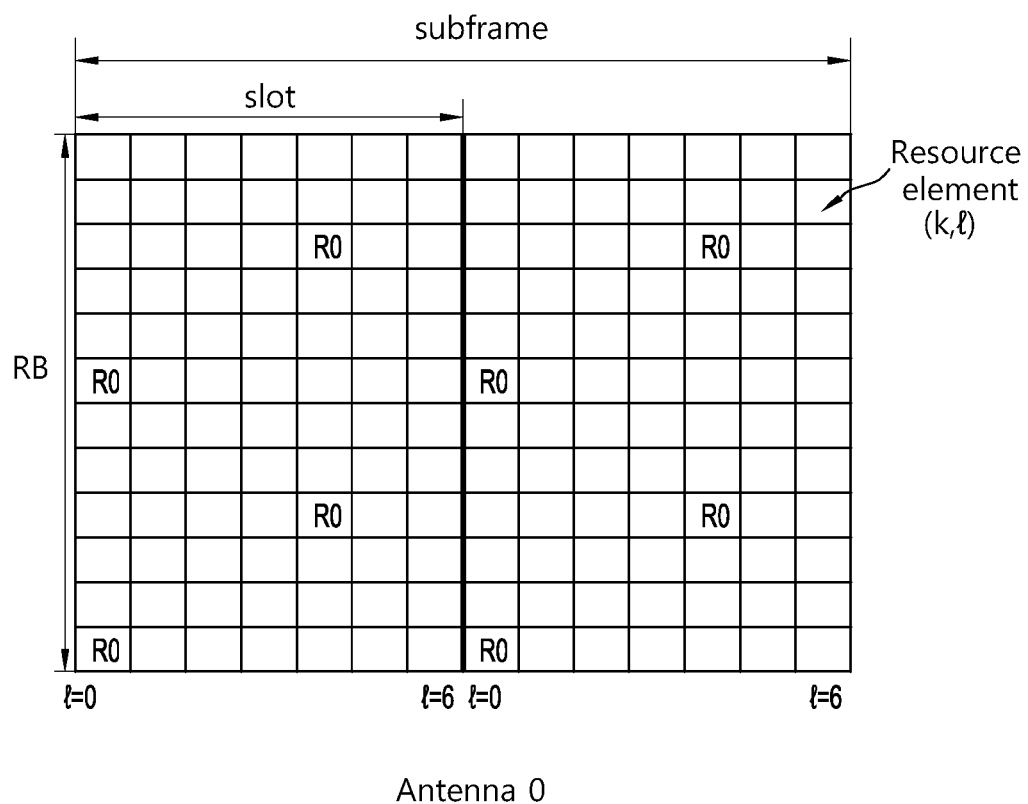
FIGS. 8 to 10 show an exemplary CRS structure.
Figure 9:
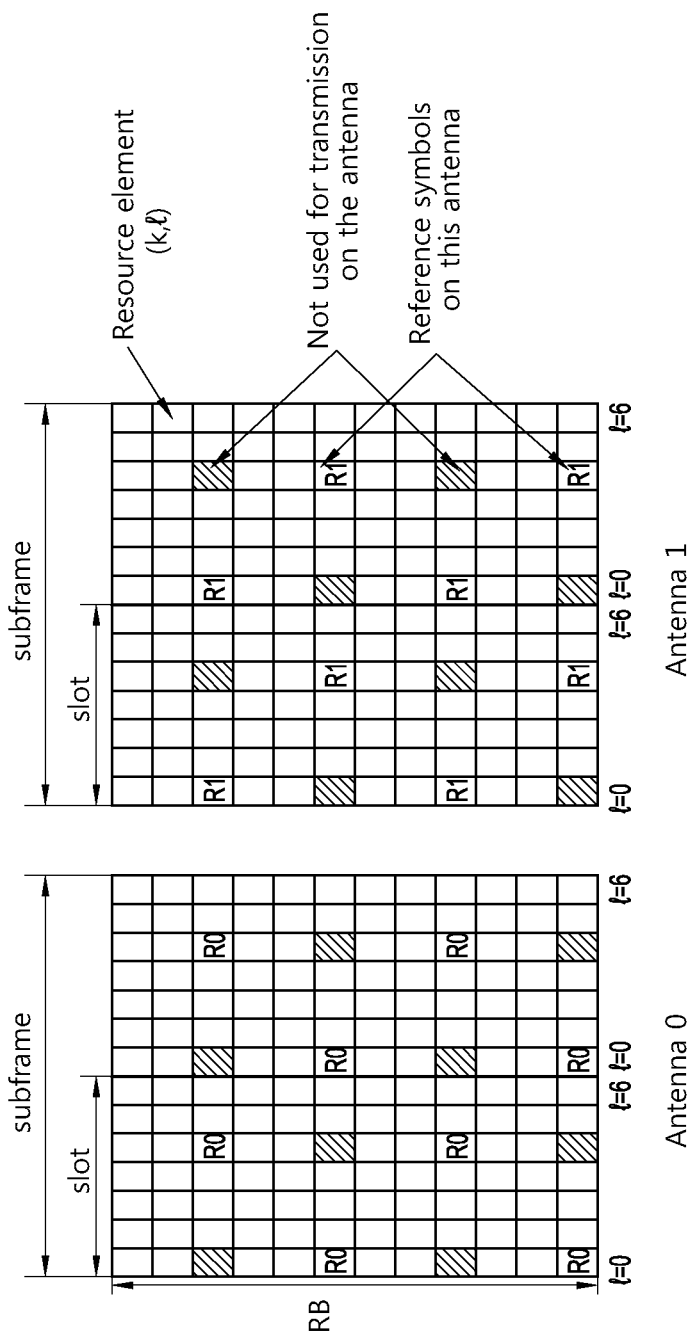
Figure 10:
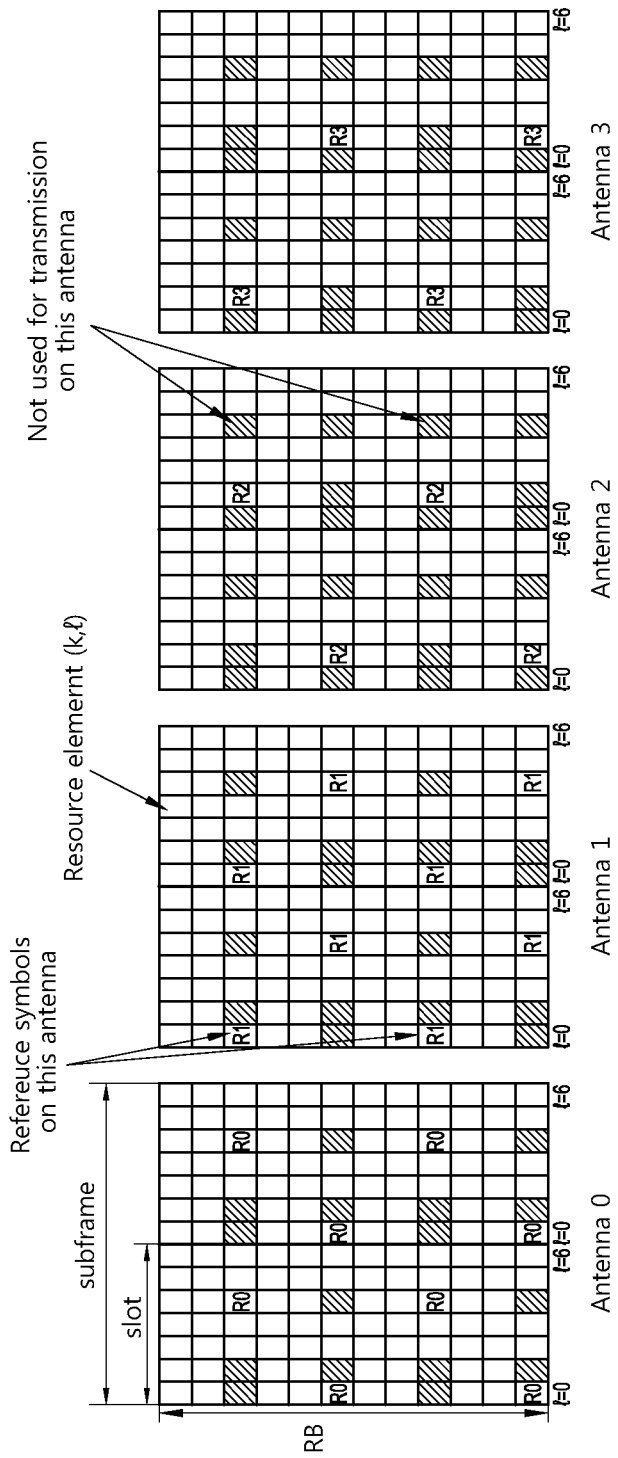

FIGS. 8 to 10 show an exemplary CRS structure. FIG. 8 shows an exemplary CRS structure when a BS uses one antenna. FIG. 9 shows an exemplary CRS structure when a BS uses two antennas. FIG. 10 shows an exemplary CRS structure when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc.

Referring to FIG. 8 to FIG. 10, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE.

Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2 \times N_{RB}$. Therefore, a length of the CRS sequence is $2 \times N_{RB}$.

Equation 2 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

Herein, m is $0, 1, \ldots, 2N_{RB,max}-1$. $N_{RB,max}$ denotes the number of resource blocks corresponding to a maximum bandwidth. For example, when using a 3GPP LTE system, $N_{RB,max}$ is 110. c(i) denotes a PN sequence as a pseudo-random sequence, and can be defined by a gold sequence having a length of 31. Equation 3 shows an example of a gold sequence c(n).

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 3]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $N_{RB,max}$, a certain part with a length of $2 \times N_{RB}$ can be selected from an RS sequence generated in a length of $2 \times N_{RB,max}$.

The CRS may be used in the LTE-A system to estimate channel state information (CSI). A reference signal for estimating channel state information may be referred to a channel state information reference signal (CSI-RS). A CSI-RS is relatively sparse deployed in a frequency domain or a time domain. A CSI-RS may be punctured in a data region of a normal subframe or an MBSFN subframe. If necessary for estimation of the CSI, channel quality indicator (CQI), a precoding matrix indicator (PMI), a rank indicator (RI), or the like may be reported from the UE.

A DRS is described below.

Figure 11:
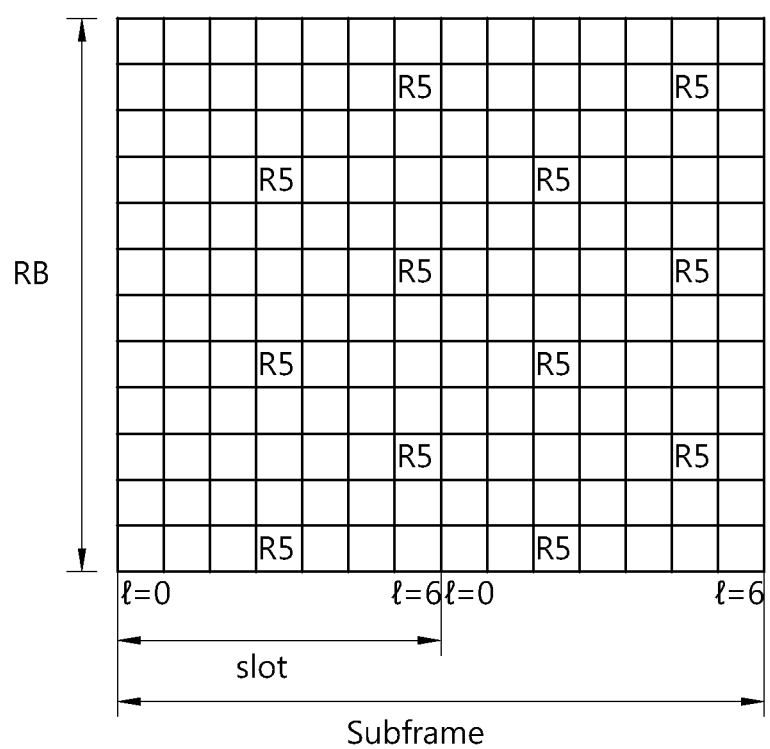
FIGS. 11 and 12 show examples of a DRS structure.
Figure 12:
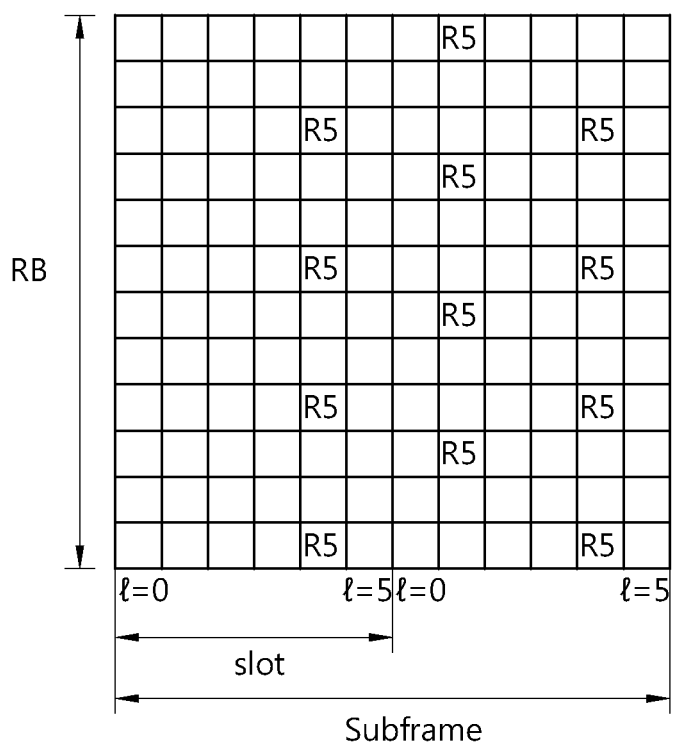

FIGS. 11 and 12 show examples of a DRS structure. FIG. 11 shows an example of the DRS structure in the normal CP (Cyclic Prefix). In the normal CP, a subframe includes 14 OFDM symbols. R5 indicates the reference signal of an antenna which transmits a DRS. On one OFDM symbol including a reference symbol, a reference signal subcarrier is positioned at intervals of four subcarriers. FIG. 12 shows an example of the DRS structure in the extended CP. In the extended CP, a subframe includes 12 OFDM symbols. On one OFDM symbol, a reference signal subcarrier is positioned at intervals of three subcarriers. For detailed information, reference can be made to Paragraph 6.10.3 of 3GPP TS 36.211 V8.2.0 (2008-03).

The position of a frequency domain and the position of a time domain within the subframe of a DRS can be determined by a resource block assigned for PDSCH transmission. A DRS sequence can be determined by a UE ID, and only a specific UE corresponding to the UE ID can receive a DRS.

A DRS sequence can be obtained using Equations 2 and 3. However, m in Equation 2 is determined by $N_{RB}^{PDSCH}$. $N_{RB}^{PDSCH}$ is the number of resource blocks corresponding to a bandwidth corresponding to PDSCH transmission. The length of a DRS sequence can be changed according to $N_{RB}^{PDSCH}$. That is, the length of a DRS sequence can be changed according to the amount of data assigned to a UE. In Equation 2, a first m-sequence $x_1(i)$ or a second m-sequence $x_2(i)$ can be reset according to a cell ID, the position of a subframe within one radio frame, a UE ID, etc. for every subframe.

A DRS sequence can be generated for every subframe and applied for every OFDM symbol. It is assumed that the number of reference signal subcarriers per resource block is 12 and the number of resource blocks is $N_{RB}^{PDSCH}$, within one subframe. The total number of reference signal subcarriers is $12 \times N_{RB}^{PDSCH}$. Accordingly, the length of the DRS sequence is $12 \times N_{RB}^{PDSCH}$. In the case in which DRS sequences are generated using Equation 2, m is $0, 1, \ldots, 12N_{RB}^{PDSCH}-1$. The DRS sequences are sequentially mapped to reference symbols. The DRS sequence is first mapped to the reference symbol and then to a next OFDM symbol, in ascending powers of a subcarrier index in one OFDM symbol.

In an LTE-A system, a DRS may be used as a demodulation reference signal (DMRS) for demodulating a PDSCH. That is, the DMRS may be said to be a concept that the DRS of an LTE Rel-8 system used for beamforming has been expanded into a plurality of layers. The PDSCH and the DMRS may comply with the same precoding operation. The DMRS may be transmitted only in a resource block or layer which is scheduled by a BS, and orthogonality is maintained between layers.

Further, the CRS can be used together with a DRS. For example, it is assumed that control information is transmitted through three OFDM symbols (l=0, 1, 2) of a first slot within a subframe. A CRS can be used in an OFDM symbol having an index of 0, 1, or 2 (l=0, 1, or 2), and a DRS can be used in the remaining OFDM symbol other than the three OFDM symbols. Here, by transmitting a predefined sequence which is multiplied by a downlink reference signal for each cell, interference between reference signals received by a receiver from neighbor cells can be reduced, and so the performance of channel estimation can be improved. The predefined sequence can be one of a PN sequence, an m-sequence, a Walsh hadamard sequence, a ZC sequence, a GCL sequence, and a CAZAC sequence. The predefined sequence can be applied to each OFDM symbol within one subframe, and another sequence can be applied depending on a cell ID, a subframe number, the position of an OFDM symbol, and a UE ID.

In a wireless communication system including a relay station, a relay zone may be defined. The relay zone refers to a section where a control channel for a relay station (hereinafter referred to as an R-PDCCH) or a data channel for a relay station (hereinafter referred to as an R-PDSCH) is transmitted within a downlink subframe transmitted by a BS. That is, the relay zone is a section where backhaul transmission is performed within a downlink subframe.

FIG. 13 is an example of a downlink subframe to which a relay zone has been allocated.

FIG. 13(a) shows an example of a downlink backhaul subframe transmitted from a BS to a relay station or UE. First 3 OFDM symbols are regions occupied by PDCCHs transmitted by the BS. In the downlink backhaul subframe, the relay zone is started from a fourth OFDM symbol, and the relay zone through which an R-PDCCH or an R-PDSCH is transmitted may be multiplexed with a PDSCH for macro UEs in accordance with a frequency division multiplexing (FDM) scheme or a method of combining the FDM scheme and a time division multiplexing (TDM) scheme. A point at which the relay zone is started may be determined by the size of an RN PDCCH transmitted by the relay station. FIG. 13(b) shows an example of a downlink access subframe transmitted from a relay station to UE. When an RN PDCCH transmitted from the relay station to the UE occupies first 2 OFDM symbols, a BS may assign a point at which a relay zone is started in a downlink backhaul subframe as a fourth OFDM symbol. The relay zone may be allocated in a cell-specific way or an RN-specific way. Furthermore, the relay zone may be allocated dynamically or semi-persistently. Meanwhile, when the relay station transmits the RN PDCCH through the first 2 OFDM symbols and then receives an uplink control signal or uplink data from the UE, there is a need for a transition time from transmission to reception. Accordingly, the third OFDM symbol may be used as a transition gap.

Figure 14:
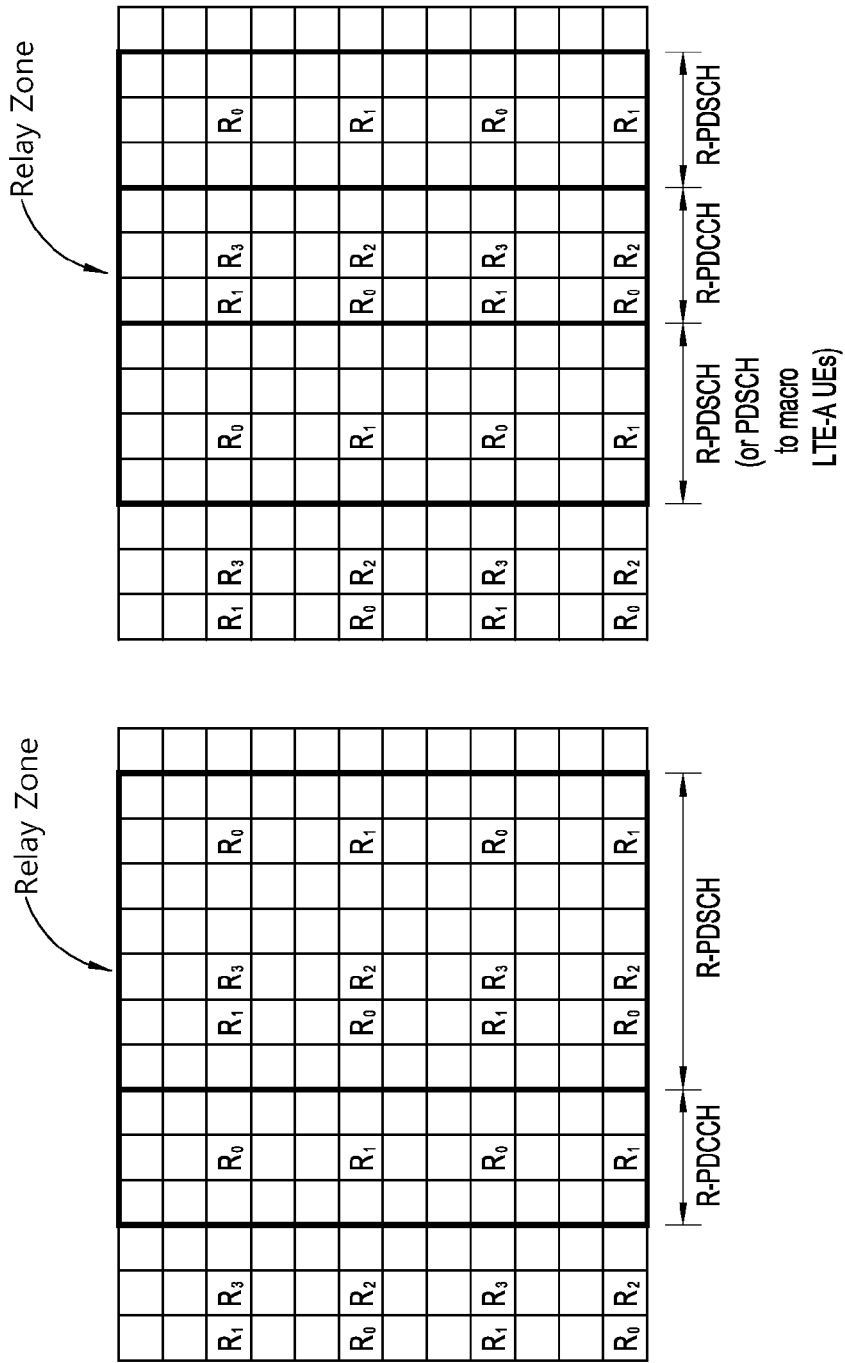
FIG. 14 is an example of a resource block to which a relay zone has been allocated.

FIG. 14 is an example of a resource block to which a relay zone has been allocated. In FIGS. 14(a) and 14(b), the relay zone is allocated from a fourth OFDM symbol to a thirteenth OFDM symbol. In FIG. 14(a), the fourth OFDM symbol to the sixth OFDM symbol are a region where an R-PDCCH is transmitted, and the seventh OFDM symbol to the thirteenth OFDM symbol are a region where an R-PDSCH is transmitted. In FIG. 14(b), an eighth OFDM symbol to a tenth OFDM symbol (i.e., the first 3 OFDM symbols of the second slot of one subframe) are a region where an R-PDCCH are transmitted, and a fourth OFDM symbol to a seventh OFDM symbol and an eleventh OFDM symbol to a thirteenth OFDM symbol are regions where an R-PDSCH or a PDSCH for a macro LTE-A UE is transmitted. Referring to FIG. 14, the R-PDCCH may be allocated right after the PDCCH region transmitted by the BS or may be allocated based on the second slot of the subframe. Meanwhile, in FIG. 14, R0 to R3 refer to resource elements to which reference signals for the antenna ports 0 to 3 of an LTE Rel-8 system are allocated.

Hereinafter, the proposed RS transmission method will be described according to an embodiment of the present invention.

A relay station can be used in an LTE-A system. The LTE-A system can support up to 8 transmit antennas. The relay station can perform channel estimation or data demodulation by receiving an RS transmitted by a base station. In this case, the RS used by the relay station may be a CRS of LTE Rel-8, a CSI-RS or demodulation reference signal (DMRS) of LTE-A, or a new CRS (it may be a DRS used in LTE-A on the basis of LTE Rel-8). Meanwhile, since a relay zone is allocated within a subframe to transmit an R-PDCCH or an R-PDSCH, the RS for the relay station needs to be allocated within the relay zone, and thus a new RS pattern which is different from the existing RS pattern is required. In the following embodiment, R0 to R3 denote CRSs of antenna ports 0 to 3 in LTE rel-8, and N0 to N7 denote new RSs for demodulation of the R-PDCCH (hereinafter, R-PDCCH RSs) with respect to layers 1 to 8 in LTE-A. In addition, a horizontal axis denotes a time domain or an OFDM symbol, and a vertical axis denotes a frequency domain or a subcarrier.

The base station can report to the relay station about information indicating whether the relay station performs decoding by using the CRS of LTE Rel-8 or performs decoding by using the DRMS of LTE-A to demodulate the R-PDCCH or the R-PDSCH. In this case, the information can be transmitted through a higher layer or can be transmitted through L1/L2 signaling using a PDCCH or broadcasting. Alternatively, the base station can report to the relay station about information indicating whether the relay station performs decoding by using the CRS of LTE Rel-8 or performs decoding by using a newly defined CRS to demodulate the R-PDCCH or the R-PDSCH. In this case, the information can be transmitted through a higher layer or can be transmitted through L1/L2 signaling using a PDCCH or broadcasting. A type of an RS which is used by the relay station to demodulate the R-PDCCH may change depending on a subframe type or may do not change dynamically. In addition, the plurality of RSs can be mapped to an R-PDCCH region.

Figure 15:
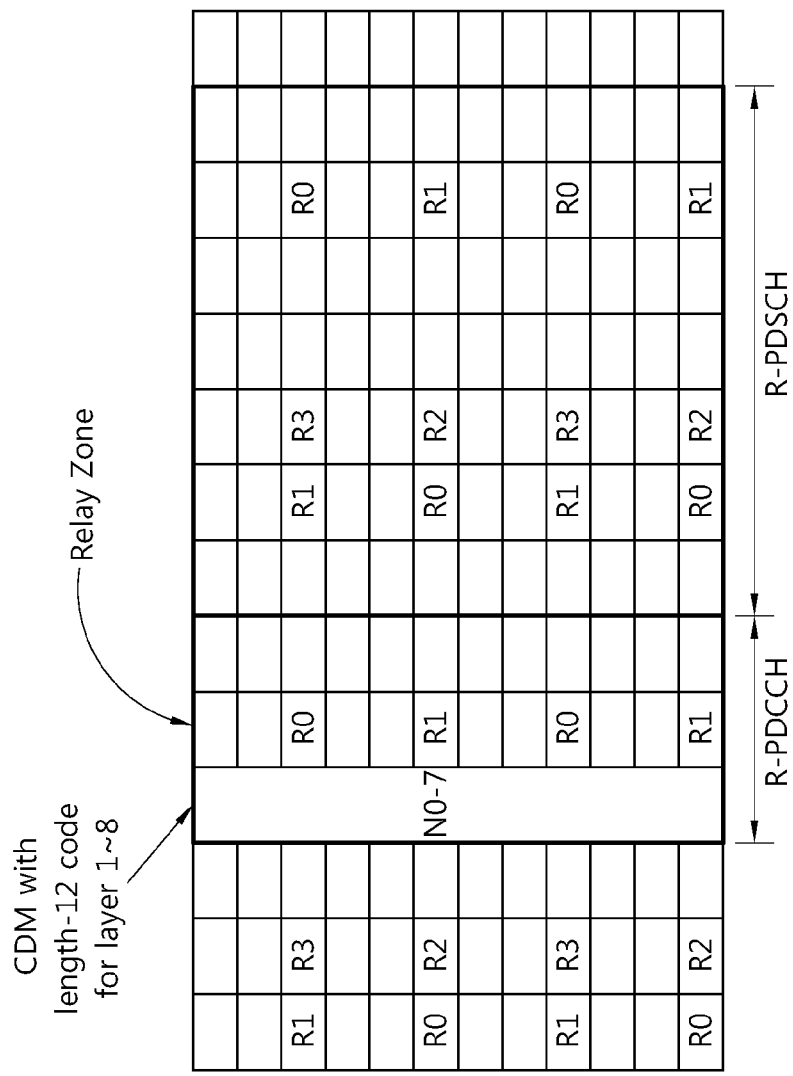
FIGS. 15 and 16 show an example of an RS pattern according to the proposed RS transmission method.

FIG. 15 shows an example of an RS pattern according to the proposed RS transmission method.

In addition to a CRS of LTE rel-8, an R-PDCCH RS can be additionally allocated. Referring to FIG. 15, the R-PDCCH RS is allocated to a $1^{st}$ OFDM symbol of an R-PDCCH region. Accordingly, the R-PDCCH RS occupies one OFDM symbol in one resource block, that is, occupies 12 resource elements. R-PDCCH RSs for respective layers can be multiplexed by using code division multiplexing (CDM) based on an orthogonal sequence. An example of the orthogonal sequence may be a Zadoff-Chu (ZC) sequence having a length of 12. For each layer, a different cyclic shift can be used in the same root index. Therefore, orthogonality can be ensured between respective layers, and channel estimation can be achieved effectively. Further, when an R-PDCCH is allocated continuously in a plurality of RBs in a frequency domain, a ZC sequence whose length is a multiple of 12 can be used as the orthogonal sequence. That is, the length of the ZC sequence may be 24, 36, etc.

Meanwhile, although it is assumed in FIG. 15 that the R-PDCCH RS is allocated to the $1^{st}$ OFDM symbol of the R-PDCCH region, the present invention is not limited thereto. Since the number of OFDM symbols occupied by the R-PDCCH can vary, the R-PDCCH RS can be allocated to any OFDM symbol in the R-PDCCH region. Further, although it is assumed in FIG. 15 that the R-PDCCH region occupies three OFDM symbols, the proposed RS pattern is also applicable when the R-PDCCH region occupies two or more OFDM symbols. Furthermore, the R-PDCCH RS can be used in combination with a CRS of LTE rel-8. For example, for transmission of up to rank-2, the existing CRS can be used as the R-PDCCH RS, and for transmission of a rank higher than rank-2, the R-PDCCH RS can be mapped by using the RS pattern of FIG. 15.

Figure 16:
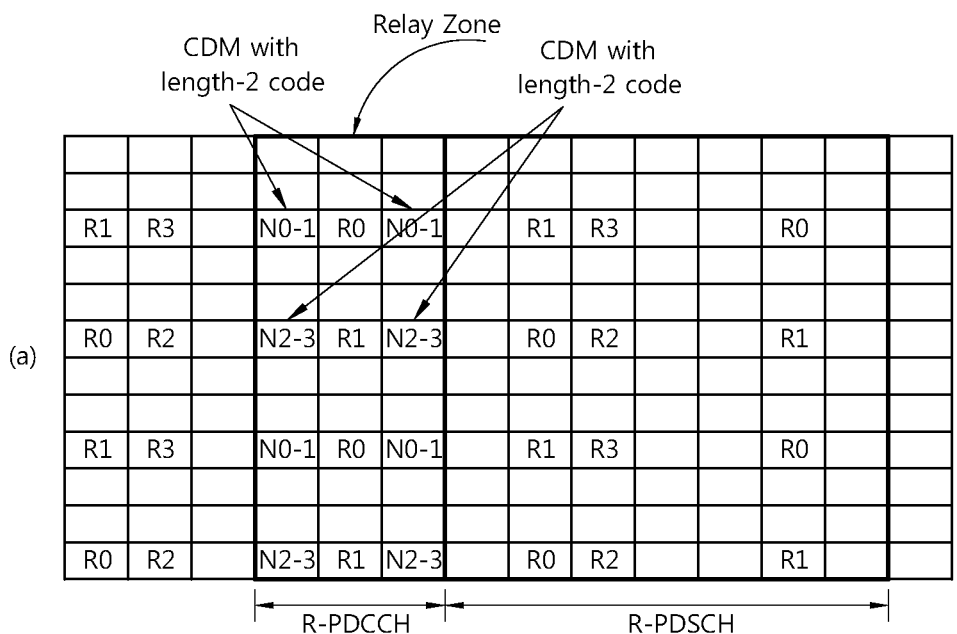
Figure 16:
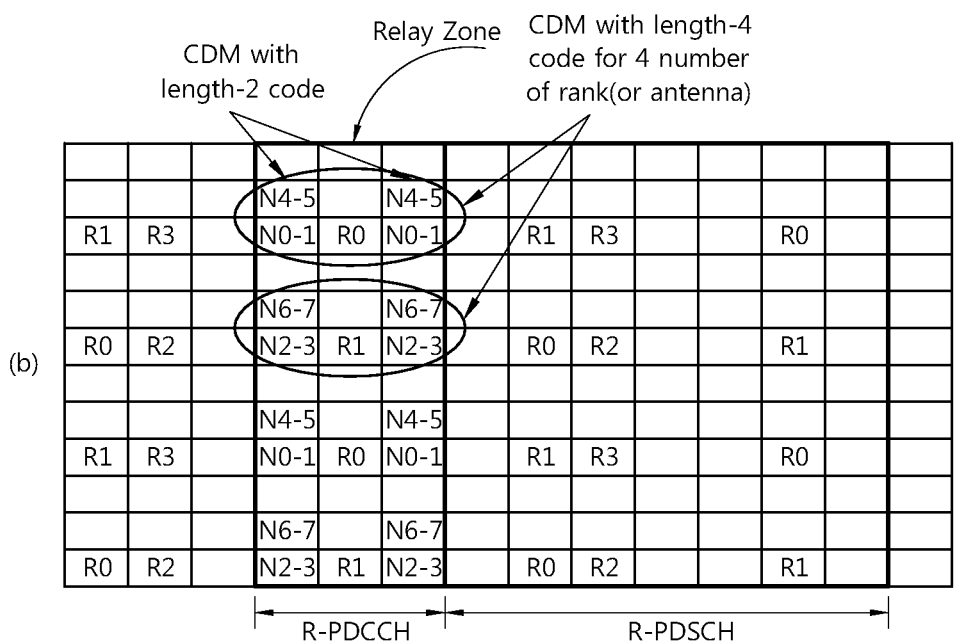

FIG. 16 shows an example of an RS pattern according to the proposed RS transmission method. FIG. 16-(a) is a rank-4 transmission case, and FIG. 16-(b) is a rank-8 transmission case. An R-PDCCH RS is allocated to a $1^{st}$ and $3^{rd}$ OFDM symbol of an R-PDCCH region. In FIG. 16-(a), R-PDCCH RSs N0 and N1 for a $1^{st}$ layer and a $2^{nd}$ layer allocated across two OFDM symbols are multiplexed using CDM on the basis of a length-2 orthogonal sequence, and R-PDCCH RSs N2 and N3 for a $3^{rd}$ layer and a $4^{th}$ layer are also multiplexed using CDM on the basis of the length-2 orthogonal sequence. In FIG. 16-(b), R-PDCCH RSs N0 and N1 for a $1^{st}$ layer and a $2^{nd}$ layer allocated across two OFDM symbols are multiplexed using CDM on the basis of a length-2 orthogonal sequence, and R-PDCCH RSs N0, N1, N4, and N5 for a $1^{st}$ layer, a $2^{nd}$ layer, a $5^{th}$ layer, and a $6^{th}$ layer are multiplexed using CDM on the basis of a length-4 orthogonal sequence. Although it is assumed in FIG. 16 that the R-PDCCH region occupies three OFDM symbols, the proposed RS pattern is also applicable to a case where the R-PDCCH region occupies three or more OFDM symbols.

Although it is assumed in the aforementioned embodiment that the R-PDCCH RS for each layer is allocated at a specific frequency location in a resource block or is allocated according to a specific frequency offset, a location at which the R-PDCCH RS is allocated in the resource block is not limited thereto. For example, although FIG. 16-(b) shows a case were the R-PDCCH RSs N4 and N5 for the $5^{th}$ layer and the $6^{th}$ layer are allocated to a $2^{nd}$ subcarrier (i.e., a frequency offset is 1) in the resource block, the R-PDCCH RSs can be allocated to a $1^{st}$ subcarrier in the resource block by allocating the frequency offset to 0. In addition, the R-PDCCH RS in the resource block can be allocated by differently allocating the frequency offset for each OFDM symbol.

Meanwhile, in the aforementioned case where the R-PDCCH region is mapped to a resource element in a subframe, a maximum overhead of the RS needs to be taken into account. That is, in a case where a DMRS of LTE-A is allocated to a backhaul subframe, an RS pattern can be determined based on a maximum number of resource elements (i.e., 24 resource elements) that can be allocated to the DMRS of LTE-A. Since the number of resource elements used in one subframe as the DMRS of LTE-A varies depending on the number of layers, the number of resource elements used as an R-PDCCH region may also vary. For example, if the number of layers is 2, the number of resource elements used as the DMRS may be 12, and if the number of layers is 4, the number of resource elements used as the DMRS may be 24. Accordingly, the number of resource elements used as the R-PDCCH region varies. Therefore, when determining the RS pattern, the RS pattern can be determined based on the maximum number of resource elements that can be used for the DMRS irrespective of the number of layers, and the R-PDCCH can be mapped to a resource region according to the determined RS pattern.

Figure 17:
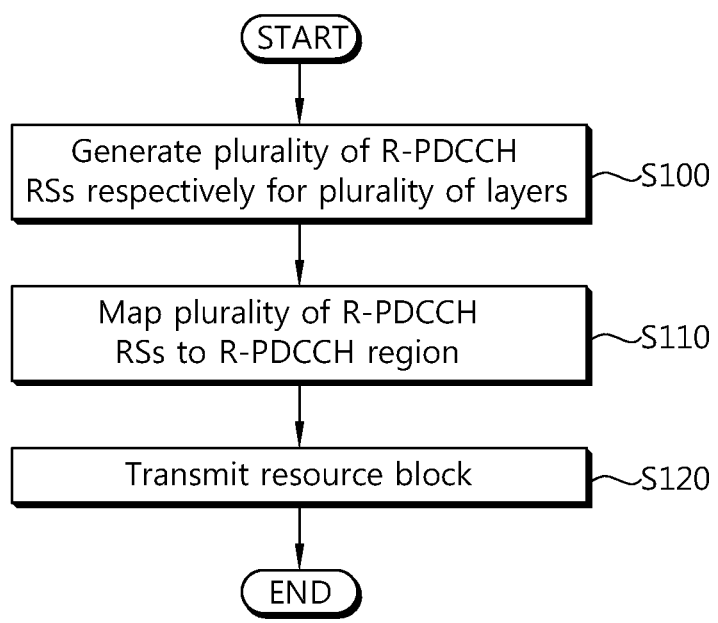
FIG. 17 shows an embodiment of the proposed RS transmission method.

FIG. 17 shows an embodiment of the proposed RS transmission method.

In step S100, a base station generates a plurality of R-PDCCH RSs for demodulation of an R-PDCCH which is a control channel for a relay station respectively for a plurality of layers. In step S110, the base station maps the plurality of R-PDCCH RSs to an R-PDCCH region included in a relay zone within at least one resource block according to a predetermined RS pattern. In step S120, the base station transmits the at least one resource block through a plurality of antenna ports.

Figure 18:
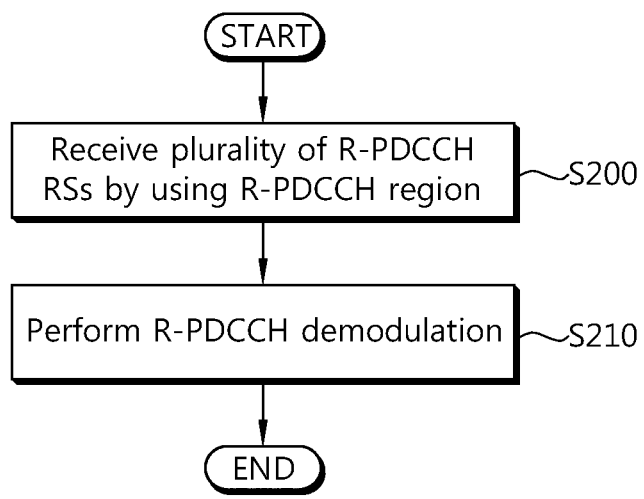
FIG. 18 shows an embodiment of the proposed control channel demodulation method.

FIG. 18 shows an embodiment of the proposed control channel demodulation method.

In step S200, a relay station receives a plurality of R-PDCCH RSs for an R-PDCCH which is a control channel for a relay station through an R-PDCCH region included in a relay zone within a downlink subframe. In step S210, the relay station demodulates the R-PDCCH by processing the plurality of R-PDCCH RSs.

A CSI-RS of LTE-A can be used as an R-PDCCH RS for demodulation of the R-PDCCH. The CSI-RS is distributed to a bandwidth to be scheduled. If the base station uses a transmission mode which uses 4 or 8 antennas, the number of antennas used to transmit a signal to the relay station may be less than 4 or 8. Accordingly, when the 8-antenna transmission mode is used, a CSI-RS for 8 antenna ports is transmitted, and a CSI-RS can be used as an R-PDCCH RS. If the CSI-RS exists across a plurality of subframes and the R-PDCCH is allocated only to one subframe among the plurality of subframes, both a CRS of the conventional LTE rel-8 and a CSI-RS of LTE-A can be used as the R-PDCCH RS.

The proposed RS transmission method is also equally applicable to an MBSFN subframe other than a normal subframe. That is, the RS pattern based on the proposed RS transmission method is also directly applicable to a case where backhaul transmission is performed in the MBSFN subframe. However, since the CRS of LTE rel-8 is not transmitted in the MBSFN subframe, when the CRS of LTE rel-8 is used as the R-PDCCH RS, a resource element to which the CRS is allocated can be directly used as a resource element to which the R-PDCCH RS is allocated. That is, the R-PDCCH RS can be allocated in the MBSFN subframe to a resource element to which the CRS is allocated in the normal subframe. Accordingly, in the normal subframe in which the CRS is transmitted or in the MBSFN subframe in which the CRS is not transmitted, the same RS pattern is applicable without changes in the RS pattern. In this case, the R-PDCCH RS is allocated according to a downlink backhaul transmission mode of the base station. For example, in case of a rank-2 downlink backhaul transmission mode, only the R-PDCCH RS for a $1^{st}$ layer and a $2^{nd}$ layer can be allocated. In addition, if the R-PDCCH RS is allocated to both the R-PDCCH region and the R-PDSCH region and the number of layers of the R-PDCCH is different from the number of layers of the R-PDSCH, the R-PDCCH and the R-PDSCH can be demodulated by allocating an R-PDCCH RS by the number corresponding to the greater number of layers. Accordingly, an amount of radio resources that can be used for the R-PDCCH and the R-PDSCH can be maintained constantly.

Alternatively, the DMRS of LTE-A can be used as the R-PDCCH RS in the MBSFN subframe. In this case, a resource element to which the DMRS of LTE-A is allocated can be directly used as a resource element to which the R-PDCCH RS is allocated. That is, the R-PDCCH RS can be allocated in the MBSFN subframe to the resource element to which the LTE-A DMRS is allocated in the normal subframe. Accordingly, in the normal subframe in which the DMRS is transmitted or in the MBSFN subframe in which the DMRS is not transmitted, the same RS pattern is applicable without changes in the RS pattern. The R-PDCCH RS is allocated according to a downlink backhaul transmission mode of the base station. For example, in case of a rank-2 downlink backhaul transmission mode, only the R-PDCCH RS for a 1st layer and a $2^{nd}$ layer can be allocated. In addition, if the R-PDCCH RS is allocated to both the R-PDCCH region and the R-PDSCH region and the number of layers of the R-PDCCH is different from the number of layers of the R-PDSCH, the R-PDCCH and the R-PDSCH can be demodulated by allocating an R-PDCCH RS by the number corresponding to the greater number of layers. Accordingly, an amount of radio resources that can be used for the R-PDCCH and the R-PDSCH can be maintained constantly.

In the MBSFN subframe, the base station can also report to the relay station about information indicating whether the relay station performs decoding by using the CRS of LTE Rel-8 or performs decoding by using the DRMS of LTE-A to demodulate the R-PDCCH or the R-PDSCH. In this case, the information can be transmitted through a higher layer or can be transmitted through L1/L2 signaling using a PDCCH or broadcasting. Alternatively, the base station can report to the relay station about information indicating whether the relay station performs decoding by using the CRS of LTE Rel-8 or performs decoding by using a newly defined CRS to demodulate the R-PDCCH or the R-PDSCH. In this case, the information can be transmitted through a higher layer or can be transmitted through L1/L2 signaling using a PDCCH or broadcasting. A type of an RS which is used by the relay station to demodulate the R-PDCCH may change depending on a subframe type or may do not change dynamically. In addition, the plurality of RSs can be mapped to an R-PDCCH region.

Although it is described in the embodiment of FIG. 15 and FIG. 16 that the proposed RS transmission method is allocated to a case where the R-PDCCH region and the R-PDSCH region are multiplexed using time division multiplexing (TDM), the present invention is not limited thereto. The proposed RS transmission method is also applicable to a case where the R-PDCCH region and the R-PDSCH region are multiplexed using frequency division multiplexing (FDM). That is, if a full resource block or a last OFDM symbol in the full resource block is allocated to a guard time, the proposed RS transmission method is applicable when the R-PDCCH region is allocated to the remaining resource blocks other than the guard time.

Meanwhile, the CSI-RS of LTE-A can be allocated by avoiding a downlink subframe used for backhaul link transmission. The CSI-RS can be allocated by avoiding, in particular, the R-PDCCH region. This is to maintain the number of resource elements occupied by the R-PDCCH region to be constant always irrespective of whether the CSI-RS is transmitted in every subframe or only in a specific subframe. Accordingly, the CSI-RS can be allocated to the R-PDSCH region. In this case, data transmitted through the R-PDSCH can be punctured in a resource element to which the CSI-RS is allocated. When the R-PDCCH region and the R-PDSCH region are multiplexed using FDM, a CSI-RS allocated to the R-PDCCH region can be punctured among CSI-RSs transmitted in a corresponding subframe, or control information transmitted in a resource element allocated to CSI-RS transmission can be punctured.

Figure 19:
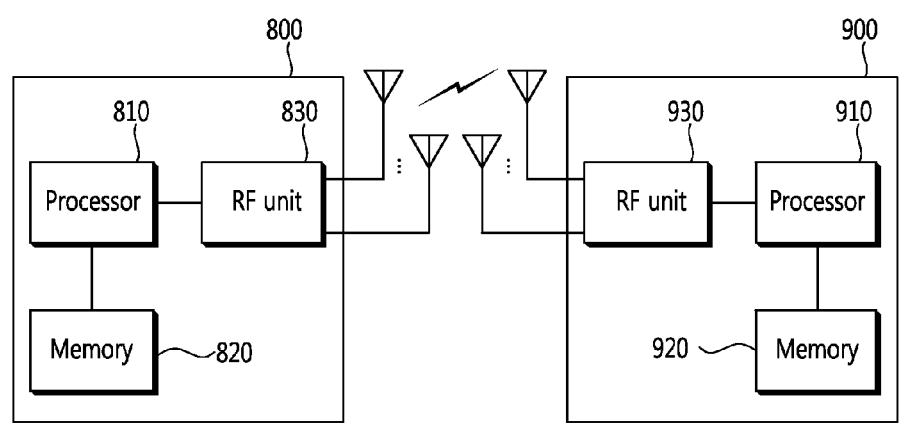
FIG. 19 is a block diagram showing a base station and a relay station according to an embodiment of the present invention.

FIG. 19 is a block diagram showing a base station and a relay station according to an embodiment of the present invention.

A base station 800 includes a processor 810, a memory 820, and a radio frequency (RF) unit 830. The processor 810 implements the proposed functions, procedures, and/or methods. The processor 810 generates a plurality of R-PDCCH RSs respectively for a plurality of layers, maps the plurality of R-PDCCH RSs to an R-PDCCH region included in a relay zone within at least one resource block according to a predetermined RS pattern, and transmits the at least one resource block through a plurality of antenna ports. The plurality of R-PDCCH RSs can be mapped according to the RS pattern of FIG. 15 and FIG. 16. Layers of a radio interface protocol can be implemented by the processor 810. The memory 820 coupled to the processor 810 stores a variety of information for driving the processor 810. The RF unit 830 coupled to the processor 810 transmits and/or receives a radio signal, and transmits the at least one resource block to the relay station.

The relay station 900 includes a processor 910, a memory 920, and an RF unit 930. The RF unit 930 coupled to the processor 910 transmits and/or receives a radio signal. The processor 910 implements the proposed functions, procedures, and/or methods. The processor 910 receives a plurality of R-PDCCH RSs for an R-PDCCH by using an R-PDCCH region, and demodulates the R-PDCCH by processing the plurality of R-PDCCH RSs. Layers of a radio interface protocol can be implemented by the processor 910. The memory 920 coupled to the processor 910 stores a variety of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting a reference signal by a base station in a wireless communication system including a relay station, the method comprising:
generating a plurality of relay-physical downlink control channel (R-PDCCH) reference signals for demodulation of an R-PDCCH which is a control channel for the relay station respectively for a plurality of layers;
mapping the plurality of R-PDCCH reference signals to an R-PDCCH region included in a relay zone within at least one resource block based on a predetermined reference signal pattern; and
transmitting the at least one resource block through a plurality of antenna ports.

2. The method of claim 1, wherein the relay zone occupies either $4^{th}$ to $13^{th}$ orthogonal frequency division multiplexing (OFDM) symbols or $5^{th}$ to $13^{th}$ OFDM symbols of one subframe.

3. The method of claim 1, wherein the R-PDCCH region occupies first three OFDM symbols of the relay zone or occupies first three OFDM symbols of a $2^{nd}$ slot of a subframe to which the relay zone belongs.

4. The method of claim 1, wherein the plurality of R-PDCCH reference signals is mapped to a $1^{st}$ OFDM symbol of the R-PDCCH region.

5. The method of claim 1, wherein the plurality of R-PDCCH reference signals is mapped to $1^{st}$ and $3^{rd}$ OFDM symbols of the R-PDCCH region.

6. The method of claim 1, wherein the plurality of R-PDCCH reference signals is multiplexed based on a code division multiplexing (CDM).

7. The method of claim 6, wherein the CDM multiplexing is performed based on an orthogonal sequence.

8. The method of claim 1, wherein some or all of the plurality of R-PDCCH reference signals are cell-specific reference signals (CRSs) of $3^{rd}$ generation partnership project (3GPP) long term evolution (LTE) or demodulation reference signals (DMRSs) of 3GPP LTE-advanced (LTE-A).

9. The method of claim 8, further comprising signaling whether to use the CRS of 3GPP LTE or the DMRS of 3GPP LTE-A as the some or all of the R-PDCCH reference signals through a higher layer.

10. The method of claim 1, wherein each of the plurality of R-PDCCH reference signals is mapped with a specific sub-carrier spacing in the at least one resource block.

11. A method of demodulating a control channel by a relay station in a wireless communication system including the relay station, the method comprising:
receiving a plurality of relay-physical downlink control channel (PDCCH) reference signals for an R-PDCCH which is a control channel for the relay station through an R-PDCCH region included in a relay zone within a downlink subframe; and
demodulating the R-PDCCH by processing the plurality of R-PDCCH reference signals.

12. The method of claim 11, wherein the plurality of R-PDCCH reference signals is mapped to a $1^{st}$ OFDM symbol of the R-PDCCH region.

13. The method of claim 11, wherein the plurality of R-PDCCH reference signals is mapped to $1^{st}$ and $3^{rd}$ OFDM symbols of the R-PDCCH region.

14. An apparatus for transmitting a reference signal, the apparatus comprising:
a radio frequency (RF) unit for transmitting or receiving a radio signal; and
a processor coupled to the RF unit,
wherein the processor is configured for:
generating a plurality of relay-physical downlink control channel (R-PDCCH) reference signals for demodulation of an R-PDCCH which is a control channel for the relay station respectively for a plurality of layers;
mapping the plurality of R-PDCCH reference signals to an R-PDCCH region included in a relay zone within at least one resource block based on a predetermined reference signal pattern; and
transmitting the at least one resource block through a plurality of antenna ports.

* * * * *